July 15, 1952  P. PICHE  2,602,996
REVOLVING SPAGHETTI FORK
Filed July 19, 1950

INVENTOR
Philippe Piché
by Edward N. Fetherstonhaugh
ATTORNEY

Patented July 15, 1952

2,602,996

UNITED STATES PATENT OFFICE 2,602,996

REVOLVING SPAGHETTI FORK

Philippe Piche, Valleyfield, Quebec, Canada

Application July 19, 1950, Serial No. 174,677

1 Claim. (Cl. 30—322)

The invention relates to improvements in a revolving spaghetti fork, as described in the present specification and illustrated in the accompanying drawings that form a part of the same.

The invention consists essentially of the novel features in construction as pointed out broadly and specifically in the claims for novelty following a description containing an explanation in detail of an acceptable form of the invention.

The objects of the invention are to devise a fork for use in eating spaghetti and the like, the shank and tines of which are rotatable together independently of the handle; to furnish a spaghetti fork by which the user may twist the spaghetti on to the prongs without the necessity of turning or moving his or her hand and wrist around; to eliminate the awkwardness of securing a portion of spaghetti around the prongs of the fork; to add to the pleasure of eating spaghetti; to construct a revolving spaghetti fork consisting of few and simple parts, easy and inexpensive to manufacture; and generally to provide a revolving spaghetti fork that is easily and simply operated for use and that is sufficient for its purpose.

In the drawings.

Like numerals of reference indicate corresponding parts in the various figures.

Figure 1:
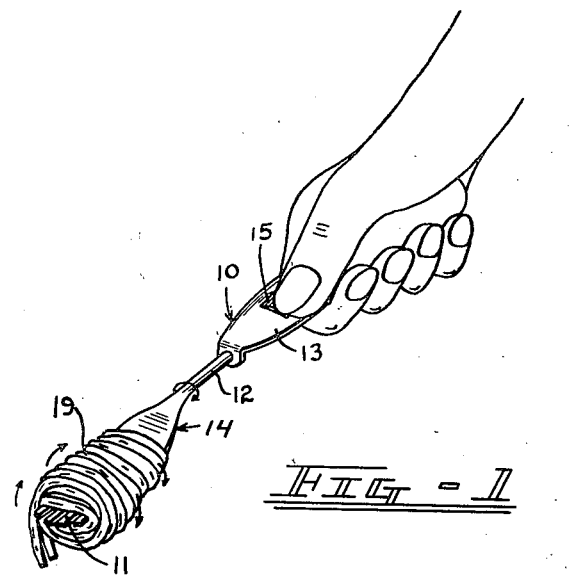
Figure 1 is a view of the spaghetti fork in use.
Figure 2:
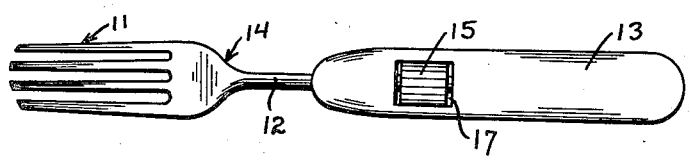
Figure 2 is a plan view of the fork.

Referring to the drawings, the spaghetti fork, as indicated by the numeral 10, consists of the tines or prongs 11, the shank 12 and the handle 13 to which the shank is rotatably mounted. The prong and shank section 14 and the handle section 13 are each separate portions made of any suitable metal, such as stainless steel.

The prong or tine and shank section 14 is suitably stamped out or otherwise fashioned to form conventional type tines but having the shank 12 round, these portions preferably being made as a single solid unit but which could be made separately and suitably secured together if found desirable to do so.

A rotatable member 15 is formed integral with the shank or otherwise fixedly secured thereto. In the present instance this member 15 is a comparatively short circular body made of any suitable material and having a central aperture extending through its length adapting it to be fitted on to the shank 12 to be positioned adjacent the free end of same, the free end of the shank projecting a short distance beyond the rear end of the member 15, which makes a tight fit with the shank to be fixed with respect to the same, or which may otherwise be fixedly secured thereto.

The handle 13 is a flat elongated portion of a desired width and having arcuate shaped ends. The front end of the handle is bent downwardly, forming a lug 16 which is provided with a centrally located aperture.

Figure 3:
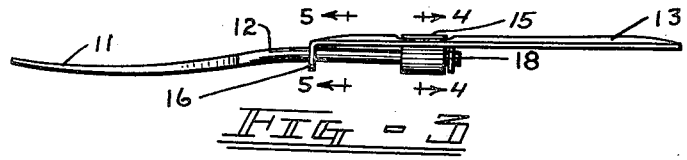
Figure 3 is a side view of the fork.
Figure 4:
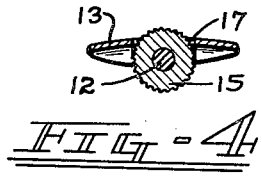
Figure 4 is an enlarged sectional detail as taken on the line 4—4 in Figure 3.
Figure 5:
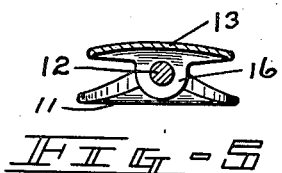
Figure 5 is an enlarged sectional detail as taken on the line 5—5 in Figure 3.

The handle is provided with an opening therethrough located towards the front end portion of the same. In the present instance this opening 17 is formed by the partial cutting out of a section of the handle and turning the same downward, this turned down section forming a lug 18 provided with a central aperture. The apertures of each of the lugs 16 and 18 being in alignment with one another, the shank 12 extending through the apertures to be mounted on the lugs, which form bearings for the shank. The rotatable member 15 on the shank is positioned on the inside of the rear lug 18 but not abutting the same, and this member 15 projects upwardly and through the opening 17 in the handle, the projecting portion being slightly above the top surface of the handle, as shown in Figure 3.

While the rear lug 18 is preferably formed by the partial cutting out of a section of the fork handle, as hereinabove described and illustrated, it could be a separate member suitably fixedly secured to the under side of the handle, the handle having a section completely cut out of same.

The opening 17 in the handle is somewhat larger than the size of the rotating member 15 so that the member 15 projects freely therethrough to be movable therein.

In the present instance, the surface of the member 15 is knurled, but it might be fashioned with lateral ridges or otherwise unevenly fashioned to provide a finger gripping or non-slipping surface.

The shank 12 is rotatable with respect to the handle of the fork, the shank fitting through the hole in each of the lugs so that it may be revolved but being of a tight enough fit so that it will not by itself be freely movable, but need outside pressure thereon to revolve it.

The hereinabove described and illustrated shank 12 is a preferable type, but the same might be made square shaped rather than round, in which case the aperture in the rotating member would be of corresponding shape to the shank.

In the operation of the revolving spaghetti fork, the person using the same grasps the handle so that his or her thumb or a finger presses down on the rotating member projecting up through the open section, as illustrated in Figure 1. Upon the prongs being inserted in a portion of the spaghetti, 19, the person merely moves his thumb, or finger, towards a side of the handle, pressing down on the rotating member and thus rotating the same which, being fixedly secured to the shank, rotates the shank and the prongs, the spaghetti being wound around the prong portion of the fork. The prongs of the fork are thus twisted or turned by the simple action of a person's thumb or finger on the rotating member, the handle of the fork being held steady and immovable with respect to the shank and tine portion. As the fork is being lifted to the mouth, the prongs may be rotated to keep the spaghetti properly wound round them.

It is of course understood that ramifications and modifications may be made without in any way departing from the spirit of the invention as hereinabove described and illustrated.

What I claim is:

A revolving spaghetti fork comprising a handle and a shank with prongs on the end thereof rotatable with respect to said handle, said handle being of a somewhat flat elongated formation with arcuately shaped ends, a lug formed on the front end of said handle and extending downward at right angles thereto and being integral therewith, said lug having a centrally located hole extending therethrough, said handle having a cut-out portion in the forward central portion thereof, and the aforementioned cut-out portion forming a lug extending downward at right angles to said handle and being located at the rear of the same cut-out, said lug formed from the cut-out in said handle having a centrally located hole, said shank extending through the centrally located openings in each of the aforesaid lugs, a rotatable member fitting over the rear portion of said shank and fixedly secured thereto, said rotatable member extending partially through the cut-out in said handle, being suitably knurled on the periphery thereof and accordingly facilitating the rotation of said shank and said prongs by manipulation of said rotatable member through the cut-out in said handle.

PHILIPPE PICHE.

REFERENCES CITED

The following references are of record in the file of this patent:

UNITED STATES PATENTS

| Number | Name | Date |
|---|---|---|
| 1,869,299 | Bracht | July 26, 1932 |
| 2,004,659 | Groch | June 11, 1935 |